US008522634B2

(12) United States Patent
Bridges

(10) Patent No.: US 8,522,634 B2
(45) Date of Patent: Sep. 3, 2013

(54) POWERTRAIN COMPRISING A THREE SPEED TRANSMISSION

(75) Inventor: Jonathan D. Bridges, Bartlesville, OK (US)

(73) Assignee: Deere & Company, Moline, IL (US)

( * ) Notice: Subject to any disclaimer, the term of this patent is extended or adjusted under 35 U.S.C. 154(b) by 319 days.

(21) Appl. No.: 13/017,163

(22) Filed: Jan. 31, 2011

(65) Prior Publication Data

US 2012/0192664 A1 Aug. 2, 2012

(51) Int. Cl.
*F16H 3/08* (2006.01)

(52) U.S. Cl.
USPC .......... 74/331

(58) Field of Classification Search
USPC .......... 74/325, 329, 331, 333, 665 F, 665 G, 74/665 GA, 665 S, 665 T
See application file for complete search history.

(56) References Cited

U.S. PATENT DOCUMENTS

| | | | | |
|---|---|---|---|---|
| 5,249,475 | A * | 10/1993 | McAskill | 74/331 |
| 5,743,142 | A * | 4/1998 | Leber et al. | 74/331 |
| 5,787,756 | A * | 8/1998 | Leber et al. | 74/331 |
| 5,819,587 | A * | 10/1998 | Leber et al. | 74/331 |
| 6,513,399 | B2 * | 2/2003 | Lamela | 74/331 |
| 6,752,034 | B2 * | 6/2004 | Huber et al. | 74/331 |
| 7,395,728 | B2 * | 7/2008 | Regenscheit | 74/331 |
| 7,421,920 | B2 * | 9/2008 | Regenscheit | 74/331 |
| 7,454,991 | B2 * | 11/2008 | Buck et al. | 74/331 |
| 8,033,194 | B2 * | 10/2011 | Suzuki | 74/331 |
| 2003/0131686 | A1 * | 7/2003 | Huber | 74/664 |

FOREIGN PATENT DOCUMENTS

| | | |
|---|---|---|
| CN | 201155550 | 11/2008 |
| DE | 10248826 | 4/2004 |
| WO | 2005003592 | 1/2005 |

OTHER PUBLICATIONS

European Search Report, Apr. 25, 2012, 8 pages.

* cited by examiner

*Primary Examiner* — Troy Chambers
*Assistant Examiner* — Michael Gonzalez

(57) ABSTRACT

Disclosed is a powertrain comprising a three speed transmission and an electric motor.

10 Claims, 8 Drawing Sheets

26
26
24
16
74
22
78
36
38
40
20
42
80
76
30
32
32

G1
20
S1
C1
G3
22
G2
82
S2
G4
S3

G5
G6
C2
74
S4
76
G8
84
G7
S5
G10
S6
G9
C3

| Reference Numeral | Name | Tooth Count |
|---|---|---|
| G1 | First Gear | 31 |
| G2 | Second Gear | 51 |
| G3 | Third Gear | 50 |
| G4 | Fourth Gear | 73 |
| G5 | Fifth Gear | 31 |
| G6 | Sixth Gear | 53 |
| G7 | Seventh Gear | 24 |
| G8 | Eigth Gear | 69 |
| G9 | Ninth Gear | 73 |
| G10 | Tenth Gear | 39 |

POWERTRAIN COMPRISING A THREE SPEED TRANSMISSION

FIELD OF THE DISCLOSURE

The present disclosure relates to a powertrain for a vehicle. More specifically, the present disclosure relates to a powertrain comprising a three speed transmission and an electric motor.

BACKGROUND OF THE DISCLOSURE

Work machines—like construction machines and agricultural machines, for example—have a power source, such as a diesel engine or a gasoline engine. In some of these work machines, the power source cooperates with an electric generator and an electric motor. Although electric motors typically have a broad speed range, a transmission may still be necessary for cooperating with the electric motor to propel the work machine effectively and efficiently.

What is needed is a powertrain comprising an electric motor and a three speed transmission. The transmission needs speeds that are useful, even if the electric motor reaches input speeds of 7200 RPM and above. Further, the transmission needs to be robust enough to endure the large forces associated with such speeds. Further yet, the transmission needs a high number of identical parts, thereby reducing the cost of each part and, ultimately, the overall cost of the transmission. Finally, the transmission needs to be arranged such that it occupies a compact space.

SUMMARY OF THE DISCLOSURE

Disclosed is a powertrain comprising an electric motor and a robust, compact transmission having three useful speeds and many identical parts The transmission has a transmission housing, and a first shaft is rotatably mounted in the transmission housing and is connected to the electric motor. A first gear is fixed for rotation with the first shaft.

Further, a second shaft is rotatably mounted in the transmission housing. A second gear is rotatably mounted about the second shaft. Additionally, a third gear and a first clutch are fixed for rotation with the second shaft. The first clutch selectively fixes the second gear for rotation with the second shaft.

In addition, a third shaft is rotatably mounted in the transmission housing. A fourth gear and a second clutch are fixed for rotation with the third shaft. The fourth gear meshes continuously with the first gear. A fifth gear is rotatably mounted about the third shaft, and it meshes continuously with the third gear. The second clutch selectively fixes the fifth gear for rotation with the third shaft.

A fourth shaft is also rotatably mounted in the transmission housing. A sixth gear is fixed for rotation with the fourth shaft and, further, is in mesh with the fifth gear.

Further, a fifth shaft is rotatably mounted in the transmission housing. A seventh gear and an eighth gear are fixed for rotation with the fifth shaft. The seventh gear is in mesh with the sixth gear.

Finally, a sixth shaft is also rotatably mounted in the transmission housing. A ninth gear and a third clutch are fixed for rotation with the sixth shaft. The ninth gear is in mesh with the fourth gear. A tenth gear is rotatably mounted about the sixth shaft and is in mesh with the eighth gear. A third clutch selectively fixes the tenth gear for rotation with the sixth shaft.

BRIEF DESCRIPTION OF THE DRAWINGS

The detailed description of the drawings refers to the accompanying figures:

FIG. 5 shows a chart identifying the tooth count of each gear in an embodiment of the transmission;

DETAILED DESCRIPTION OF THE DRAWINGS

Figure 1:
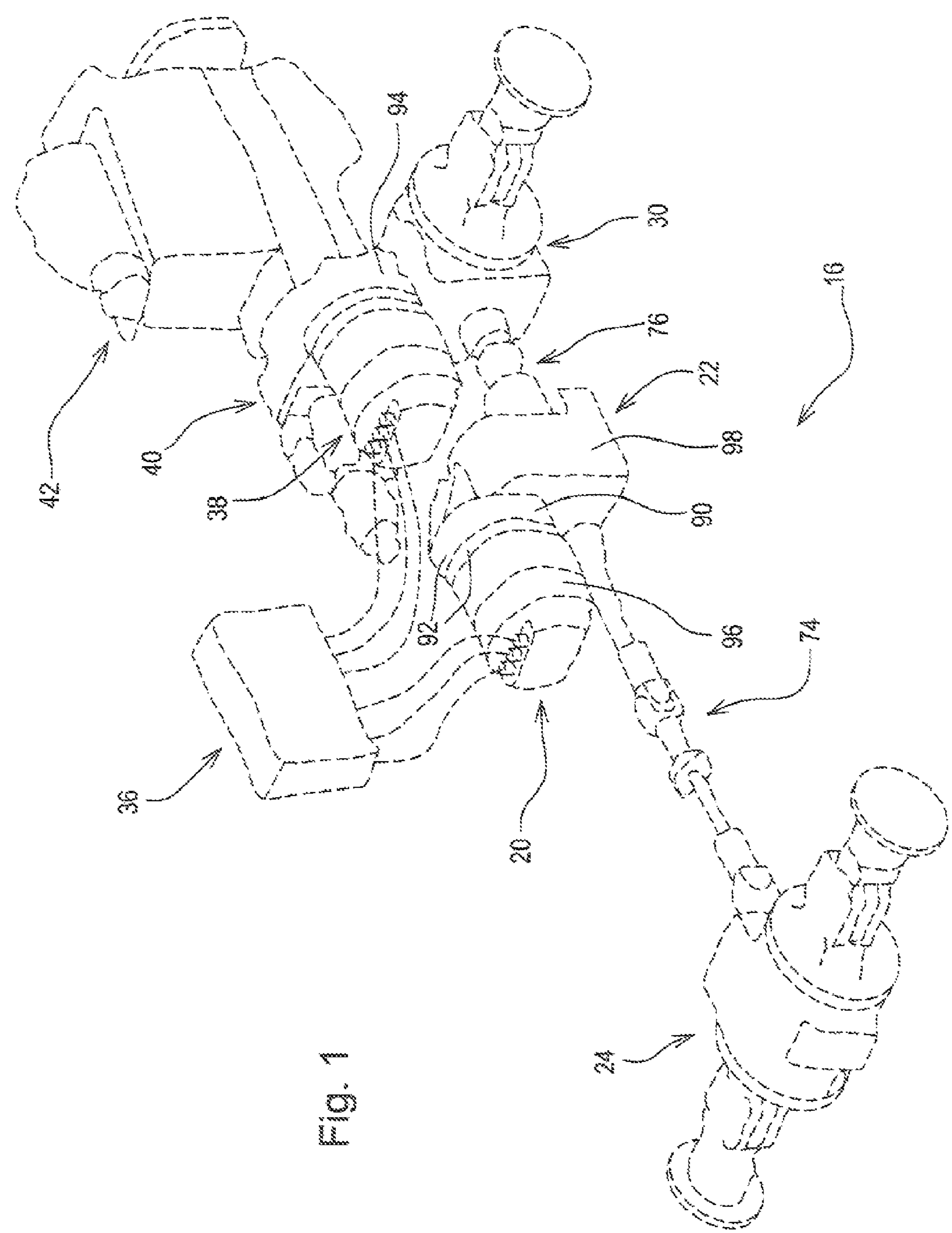
FIG. 1 shows a perspective view of a powertrain.

In the detailed description of the drawings, the reference numerals take the following forms: G for gears, S for transmission shafts, and C for clutches. The reference numerals for the remaining assemblies and parts are in the traditional numeric form.

FIGS. 1-2

Figure 2:
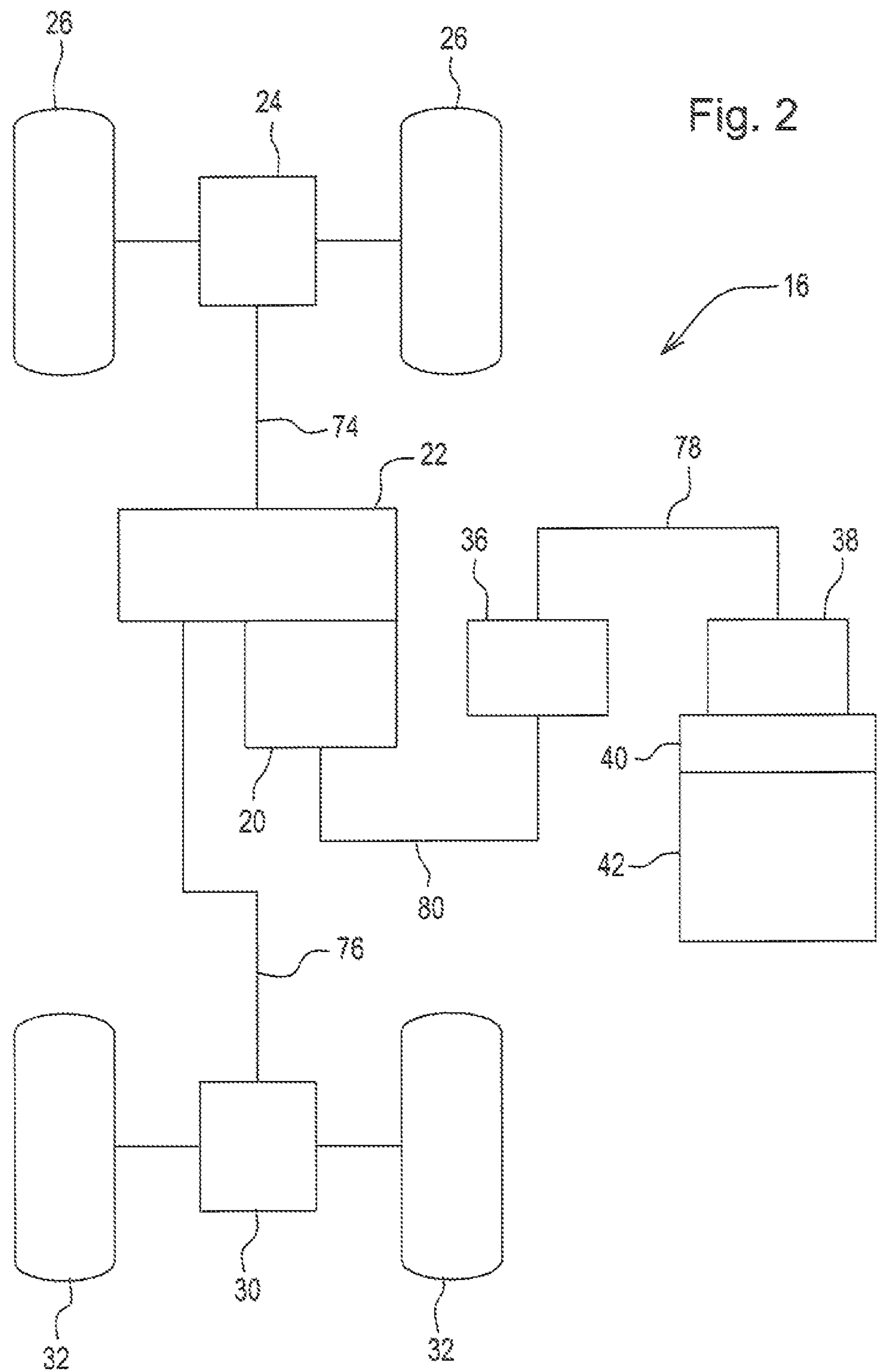
FIG. 2 shows a diagrammatic view of the powertrain.

FIG. 1 shows a perspective view of a powertrain 16, and FIG. 2 shows a diagrammatic view of the powertrain 16. The powertrain 16 may be used in a work machine (not shown) such as a construction machine or an agricultural machine. The powertrain 16 comprises a power source 42, which may be, for example, a diesel engine or a gasoline engine. The power source 42 may be coupled to a generator drive 40, whereby the generator drive 40 may convert the rotational speed of the power source 42 to a speed more suitable for an electric generator 38 that is coupled to the generator drive 40. As the electric generator 38 produces an electric output, it travels through a first cable 78; power electronics 36; a second cable 80; and, finally, to an electric motor 20.

The electric motor 20 is enclosed in an electric motor housing 96. Exemplarily, the electric motor housing 96 is mounted exclusively to a three speed transmission 22. To support the electric motor 20, the transmission 22 may include a bell housing 90 having strengthening ribs 92. The transmission 22 may be connected to a front output shaft 74 and a rear output shaft 76. Further, a front axle 24 may be connected to the front output shaft 74, and a rear axle 30 may be connected to the rear output shaft 76. Ultimately, the front axle 24 and the rear axle 30 propel the work machine via front wheels 26 and rear wheels 32 respectively.

FIGS. 3-4

Figure 3:
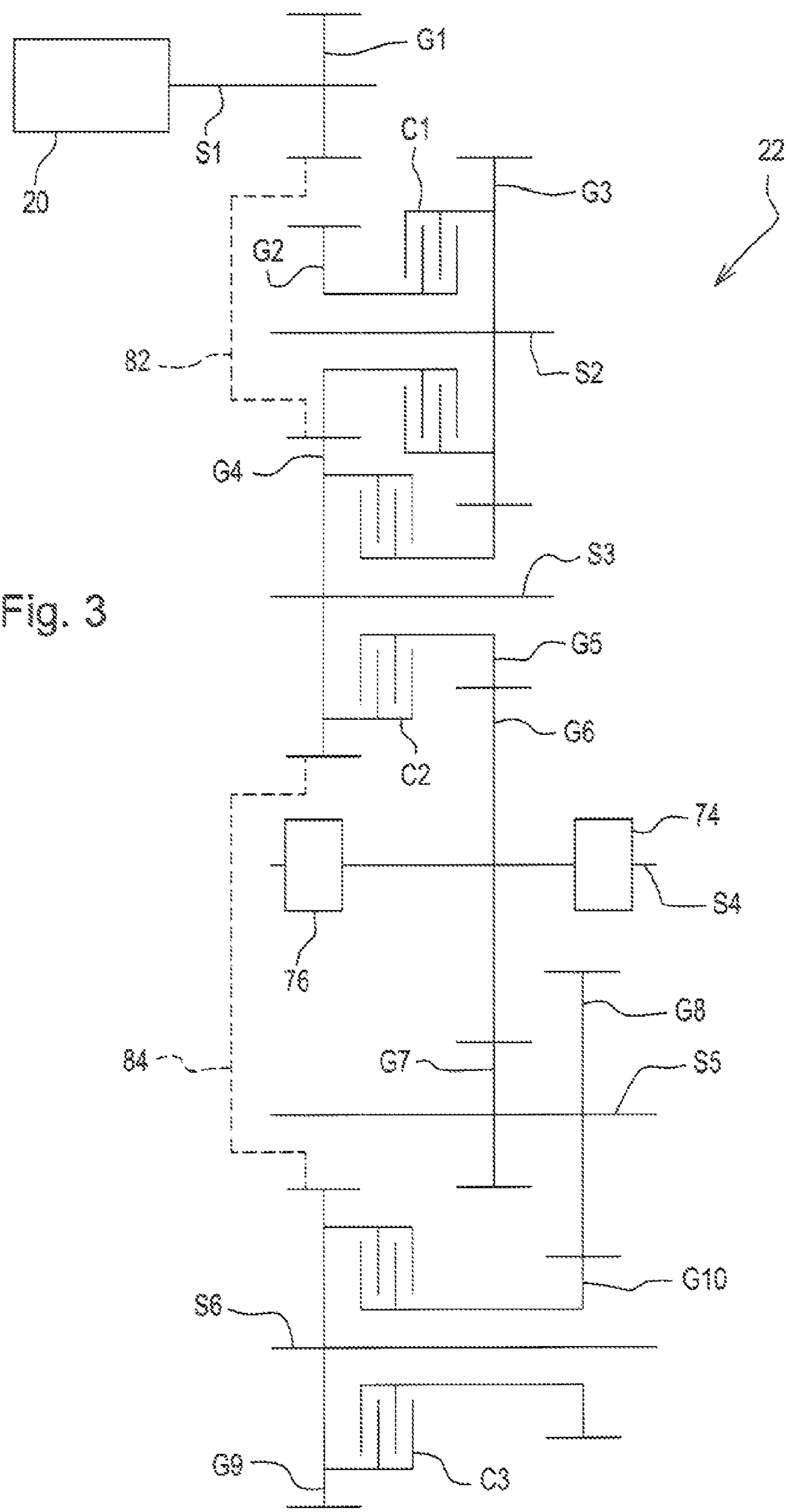
FIG. 3 shows an unfolded schematic representation of a three speed transmission.
Figure 4:
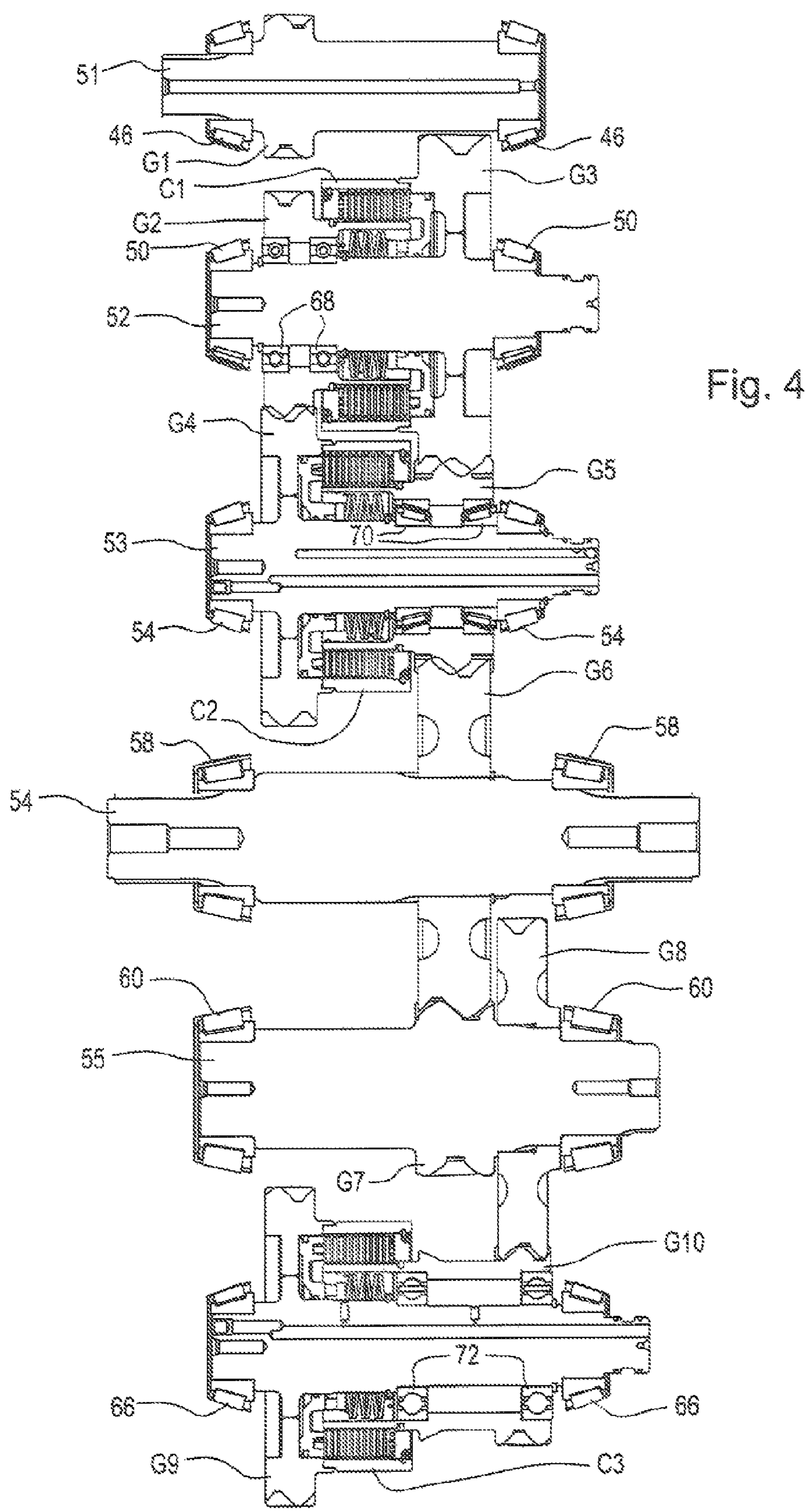
FIG. 4 shows an unfolded sectional view of the transmission.

FIG. 3 is an unfolded schematic representation of the transmission 22, while FIG. 4 is, alternatively, an unfolded sectional view of the transmission 22. A first shaft S1 is rotatably mounted in the transmission housing 98 (see FIG. 1) and is connected to the electric motor 20 (see FIG. 1) via, for example, a spline formed into first shaft S1. The first shaft S1 may rotate via a pair of tapered roller bearings 46 that may be substantially similar and may be placed about first shaft S1 via a press fit. A first gear G1 is fixed for rotation with the first shaft S1 and is, exemplarily, formed into the first shaft S1.

A second shaft S2 is also rotatably mounted in the transmission housing 98 and may rotate via a pair of tapered roller bearings 50. The pair of tapered roller bearings 50 may be substantially similar and may be placed about second shaft S2 via a press fit. A second gear G2 is rotatably mounted about the second shaft S2. Furthermore, a third gear G3 and a first clutch C1 are fixed for rotation with the second shaft S2. The first clutch C1 selectively fixes the second gear G2 for rotation with the second shaft S2. When first clutch C1 is not engaged, the second gear G2 may be free to rotate relative to the second shaft S2 via, for example, a pair of ball bearings 68. The pair of ball bearings 68 may be substantially similar, and they may be placed about the second shaft S2 via press fits. Exemplarily, the third gear G3 is fixed to the second shaft S2 via a weld.

In addition, a third shaft S3 is also rotatably mounted in the transmission housing 98. The third shaft S3 may rotate via a pair of tapered roller bearings 54 that may be substantially similar and may be placed about third shaft S3 via a press fit. A fourth gear G4 and a second clutch C2 are fixed for rotation with the third shaft S3. As shown in FIG. 3, by the first dotted line 82, the fourth gear G4 meshes continuously with the first gear G1 and the second gear G2. To accommodate the high input speeds, the input power may be immediately reduced upon entering the transmission 22 through a gear pair—the first gear G1 and the fourth gear G4—with a high reduction ratio of, for example, 2.35 before passing to other shafts. The fourth gear G4 may be fixed to the third shaft S3 via a weld. Also, a fifth gear G5 is rotatably mounted about the third shaft S3, and the fifth gear G5 meshes continuously with the third gear G3. The second clutch C2 selectively fixes the fifth gear G5 for rotation with the third shaft S3. When the second clutch C2 is not engaged, fifth gear G5 may rotate freely relative to third shaft S3 via, for example, a pair of tapered roller bearings 70 that are placed about third shaft S3 via press fits.

Additionally, a fourth shaft S4 is rotatably mounted in the transmission housing 98. A sixth gear G6 is fixed for rotation with the fourth shaft S4 and is in mesh with the fifth gear G5. The sixth gear G6 may be mounted to the fourth shaft S4 via a spline fit. A first pair of tapered roller bearings 58 may be mounted about the fourth shaft S4, and they may be substantially similar.

A fifth shaft S5 is also rotatably mounted in the transmission housing 98. A seventh gear G7 and an eighth gear G8 are fixed for rotation with the fifth shaft S5. The seventh gear G7 is in mesh with the sixth gear G6. Exemplarily, the seventh gear G7 is formed into the fifth shaft S5. The eighth gear G8 may be mounted to the fifth shaft S5 via the combination of a spline fit and a smooth press fit. A second pair of tapered roller bearings 60 may be mounted about the fifth shaft S5. The first pair of tapered roller bearings 58 and the second pair of tapered roller bearings 60 may be substantially similar, and they may all be placed about their respective shafts via press fits.

Finally, a sixth shaft S6 is also rotatably mounted in the transmission housing 98 via, for example, a pair of tapered roller bearings 66. The pair of tapered roller bearings 66 may be substantially similar and may be placed about the sixth shaft S6 via press fits. A ninth gear G9 and a third clutch C3 are fixed for rotation with the sixth shaft S6. As shown in FIG. 3, by the second dotted line 84, the ninth gear G9 meshes continuously with fourth gear G4. The ninth gear G9 may be fixed to the fourth shaft S4 via a weld. A tenth gear G10 is rotatably mounted about the sixth shaft S6. The tenth gear G10 is in mesh with the eighth gear G8, and the third clutch C3 selectively fixes the tenth gear G10 for rotation with the sixth shaft S6. When the tenth gear G10 is not fixed for rotation with the sixth shaft S6, the tenth gear G10 may be free to rotate relative to the sixth shaft S6 via, for example, a pair of ball bearings 72. The pair of ball bearings 72 may be substantially similar and may be placed about the sixth shaft S6 via press fits.

The pairs of tapered roller bearings 46, 50, 54, and 66 may all be substantially similar to one another.

The aforementioned shafts may generally be short in length and thick in section, and the aforementioned gears may be helical gears having large, wide gear teeth. Further, the aforementioned shafts and gears may all be made of, for example, a heat treated steel, such as 4150 steel, 4120 steel, 4140 steel, or 8620 steel. Still further, the first, second, and third clutches C1, C2, and C3 may all be substantially similar, and further, they may all be wet clutches.

FIG. 5

FIG. 5 is a chart identifying the tooth count of each gear in an exemplary embodiment of the transmission 22. In this embodiment, first gear G1 has a tooth count of 31, the second gear G2 has a tooth count of 51, and so on. The particular ratios shown on this chart are useful, even as the electric motor 20 reaches input speeds of 7200 RPM and above.

Figure 6:
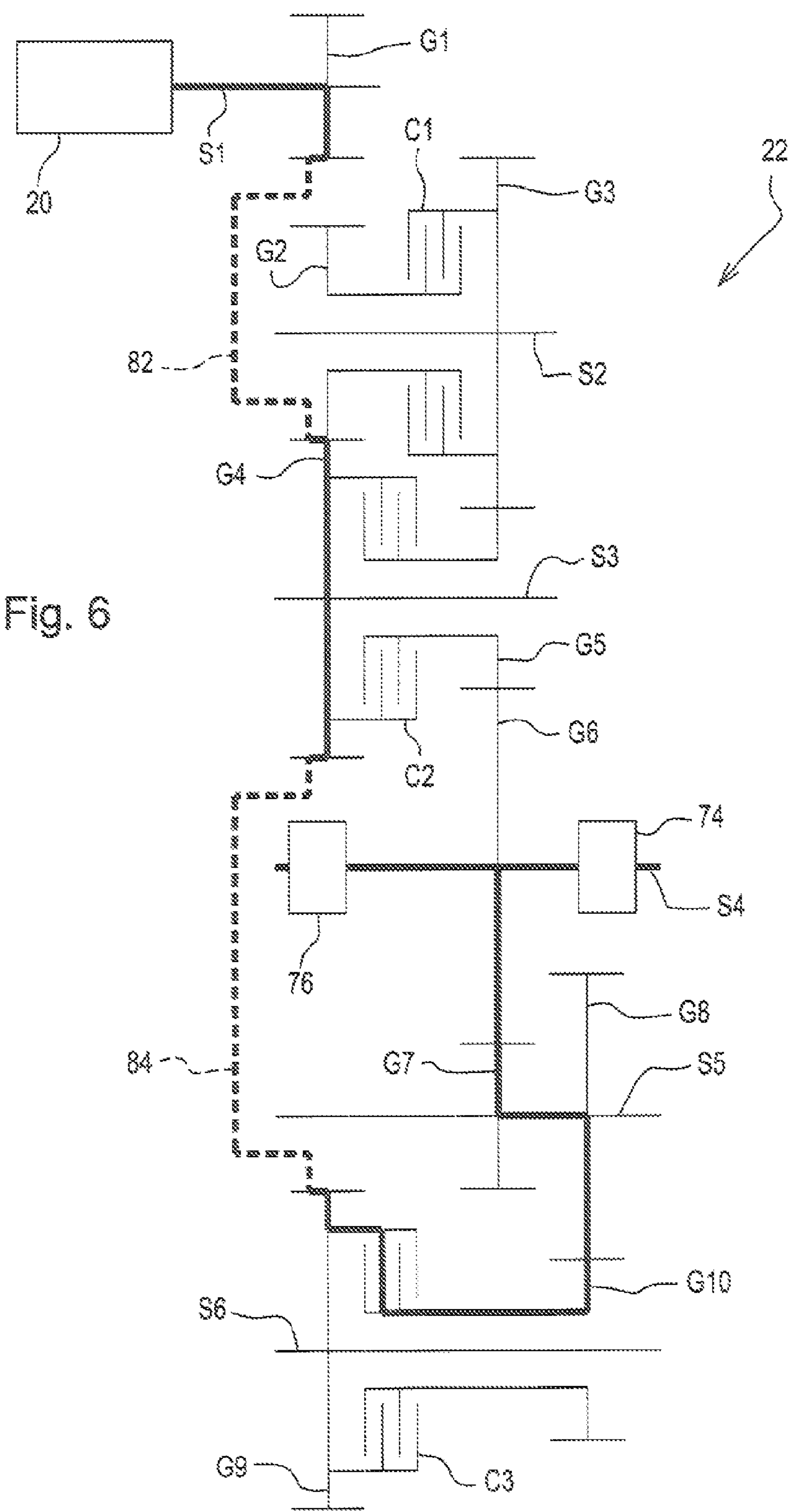
FIG. 6 shows an unfolded schematic representation of the power flow of transmission as it operates in a first speed.

FIG. 6: First Speed

FIG. 6 is an unfolded schematic representation of the power flow of the transmission 22 when it operates in a first speed. The bold line represents the power flow from the electric motor 20 to the front output shaft 74 and the rear output shaft 76. In the first speed, the third clutch C3 is selectively engaged, and the transmission 22 may have, as shown, an overall gear ratio of 9.2.

Figure 7:
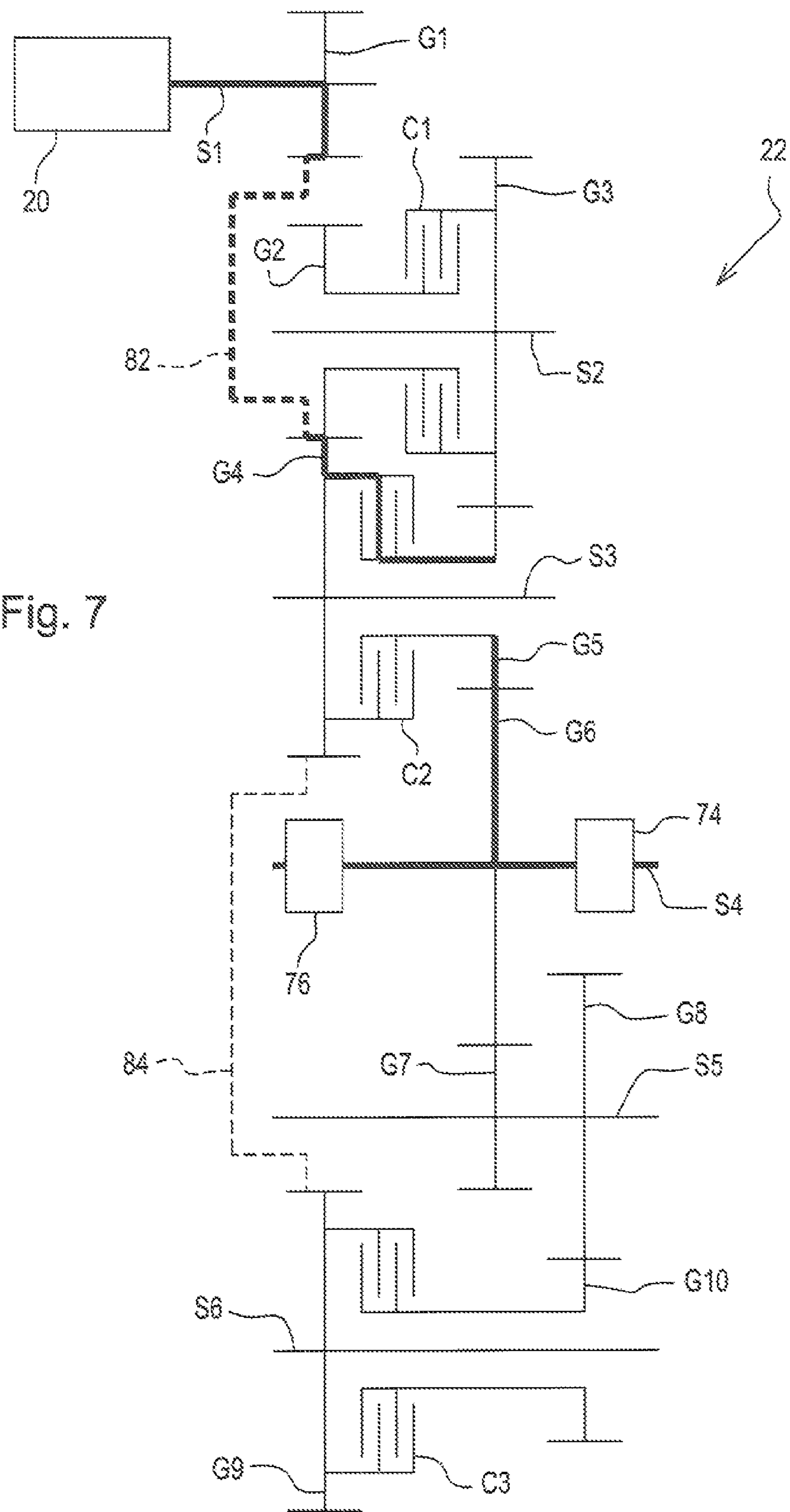
FIG. 7 shows an unfolded schematic representation of the power flow of the transmission as it operates in a second speed.

FIG. 7: Second Speed

FIG. 7 is an unfolded schematic representation of the power flow of the transmission 22 when it operates in a second speed. The bold line represents the power flow from the electric motor 20 to the front output shaft 74 and the rear output shaft 76. In the second speed, the second clutch C2 is selectively engaged, and the transmission 22 may have, as shown, an overall gear ratio of 4.026. The layout of transmission 22 is optimized such that when it operates, in the second speed, only three of the six shafts are included in the power path. In at least some common applications, the second speed may be used 70% of the time the work vehicle is in operation. Such an arrangement may contribute to increased service intervals and reduced fuel consumption, because the efficiency of the transmission for a particular speed depends, in part, on the number of loaded gear meshes required to achieve the necessary gear ratio.

Figure 8:
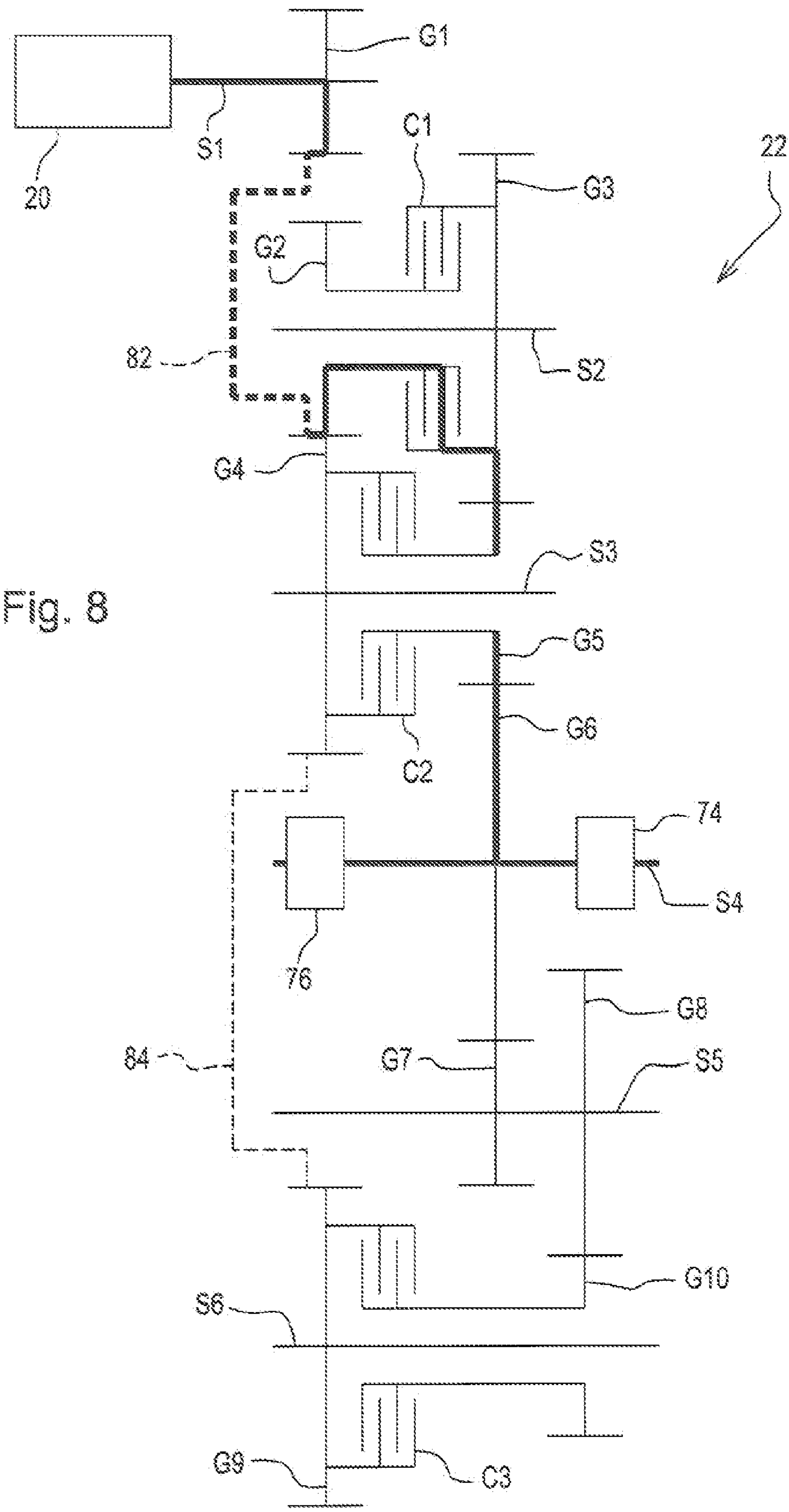
FIG. 8 shows an unfolded schematic representation of the power flow of the transmission as it operates in a third speed.

FIG. 8: Third Speed

FIG. 8 is an unfolded schematic representation of the power flow of the transmission 22 when it operates in a third speed. The bold line represents the power flow from the electric motor 20 to the front output shaft 74 and the rear output shaft 76. In the third speed, the first clutch C1 is selectively engaged, and the transmission 22 may have, as shown, an overall gear ratio of 1.744. As shown, the ratio of low speed divided by the high speed is 5.3.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A powertrain, comprising an electric motor and a three speed transmission connected to the electric motor, wherein the three speed transmission comprises:

a transmission housing;

a first shaft rotatably mounted in the transmission housing and connected to the electric motor;

a first gear fixed for rotation with the first shaft;

a second shaft rotatably mounted in the transmission housing;

a second gear rotatably mounted about the second shaft;

a third gear and a first clutch fixed for rotation with the second shaft, wherein the first clutch selectively fixes the second gear for rotation with the second shaft;

a third shaft rotatably mounted in the transmission housing;

a fourth gear and a second clutch fixed for rotation with the third shaft, wherein the fourth gear meshes continuously with the first gear and the second gear;

a fifth gear rotatably mounted about the third shaft, wherein the fifth gear meshes continuously with the third gear, and the second clutch selectively fixes the fifth gear for rotation with the third shaft;

a fourth shaft rotatably mounted in the transmission housing;

a sixth gear fixed for rotation with the fourth shaft, wherein the sixth gear is in mesh with the fifth gear;

a fifth shaft rotatably mounted in the transmission housing;

a seventh gear and an eighth gear fixed for rotation with the fifth shaft, wherein the seventh gear is in mesh with the sixth gear;

a sixth shaft rotatably mounted in the transmission housing;

a ninth gear and a third clutch fixed for rotation with the sixth shaft, wherein the ninth gear is in mesh with the fourth gear; and a tenth gear rotatably mounted about the sixth shaft, wherein the tenth gear is in mesh with the eighth gear, and the third clutch selectively fixes the tenth gear for rotation with the sixth shaft.

2. The powertrain of claim 1, further comprising an electric motor housing for enclosing the electric motor, wherein the electric motor housing is mounted only to the transmission housing.

3. The powertrain of claim 1, wherein when the first clutch is selectively engaged, the three speed transmission has an overall gear ratio within 20% of 9.2.

4. The powertrain of claim 1, wherein when the third clutch is selectively engaged, the three speed transmission has an overall gear ratio within 20% of 1.744.

5. The powertrain of claim 1, wherein the first, second, and third clutches are all substantially similar wet clutches.

6. The powertrain of claim 1, further comprising a first pair of tapered roller bearings mounted about the fourth shaft, a second pair of tapered roller bearings mounted about the fifth shaft, wherein the first and second pairs of tapered roller bearings are substantially similar.

7. The powertrain of claim 1, further comprising:

a front output shaft connected to the fourth shaft;

a front axle connected to the front output shaft;

a rear output shaft connected to the fourth shaft; and a rear axle connected to the rear output shaft.

8. The powertrain of claim 1, wherein all of the shafts and all of the gears are all made of heat treated steel.

9. The powertrain of claim 1, wherein when the second clutch is selectively engaged, the three speed transmission has an overall gear ratio within 20% of 4.026.

10. The powertrain of claim 9, wherein only the first shaft, third shaft, and fourth shaft are included in the power path.

* * * * *